Figure 1:
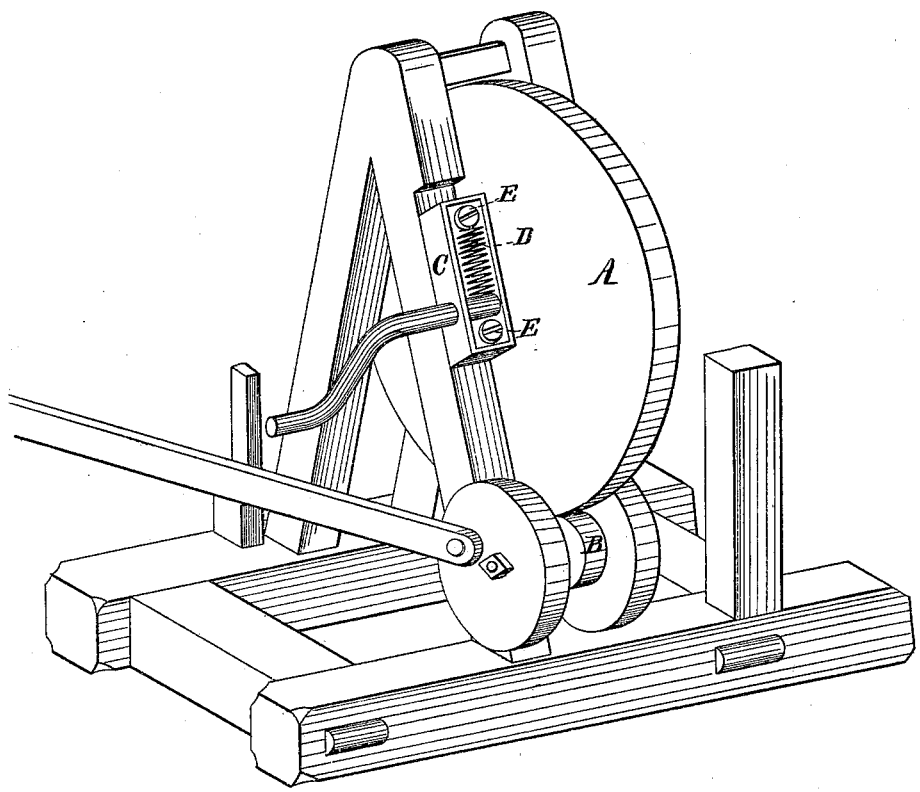

R. Sammer,
Converting Motion.
No. 113,801. Patented Apr. 18, 1871.

Witnesses.
Franklin Rowell
Willis S. Virgil

Inventor.
Richard Sammer

United States Patent Office.

RICHARD SAMMER, OF VINELAND, NEW JERSEY.

Letters Patent No. 113,801, dated April 18, 1871.

IMPROVEMENT IN APPARATUS FOR CONVERTING ROTARY INTO RECIPROCATE MOTION BY MEANS OF FRICTION.

The Schedule referred to in these Letters Patent and making part of the same.

Be it know that I, RICHARD SAMMER, of Vineland, county of Cumberland and State of New Jersey, have invented a new and useful Combination of a Spring Shaft-Box with Friction Power; and I do hereby certify that the following is a full, clear, and exact description of the same, reference being had to the annexed drawing making a part of this specification.

Figure 1 is a perspective view of a friction power with shaft in movable spring-box.

A is a friction driving-wheel, bearing upon B, a speed-wheel.

C is a movable spring shaft-box, containing D, a spiral spring, which forces driving-wheel A against speed-wheel B, enabling it to work downward, horizontally, or upward.

E E are headed bolts, sliding in slots at bottom of shaft-box, the bolt-heads bearing against a portion of the box bottom, on either side of the slots, and holding it in place.

The effect of the movable spring shaft-box upon cog-wheel gearing is to keep the wheels in a perfect lock and prevent weakness, irregular action, and noise.

What I claim as my invention is—

The movable spring shaft-box and its combination with friction power, substantially as shown.

RICHARD SAMMER.

Witnesses:
FRANKLIN ROWELL,
W. T. VIRGIL.